United States Patent Office 3,300,490
Patented Jan. 24, 1967

3,300,490
PROCESS FOR THE PREPARATION OF CRYSTALLINE TRIGLYCIDYL ISOCYANURATE
Manfred Budnowski, Dusseldorf-Holthausen, Germany, assignor to Henkel & Cie. G.m.b.H., Dusseldorf-Holthausen, Germany, a corporation of Germany
No Drawing. Filed June 25, 1965, Ser. No. 467,140
Claims priority, application Germany, July 16, 1964, H 53,271
10 Claims. (Cl. 260—248)

This invention relates to a novel process for the preparation of crystalline triglycidyl isocyanurate in excellent yields.

Crystalline triglycidyl isocyanurate has not previously been described in the literature. My copending United States patent application Ser. No. 292,725, filed July 3, 1963, describes the production of crystalline triglycidyl isocyanurate and its unique properties. According to this patent application, this product, crystalline triglycidyl isocyanurate, yields resins with surprisingly high temperature stability on reaction with conventional hardeners for epoxide compounds. For this reason, economical methods of preparation for the crystallized triglycidyl isocyanurate are of considerable interest.

According to copending, commonly assigned United States patent application Ser. No. 288,593, filed June 18, 1963, hardenable compounds containing glycidyl groups may be obtained by reaction of cyanuric acid with epichlorohydrin at temperatures of 80 to 200° C. and subsequent removal of the volatile constituents, when untilizing at least 15 mols of epichlorohydrin to each mol of syanuric acid. As I have shown in Ser. No. 292,725, the product obtained by this process consists to a considerable extent of triglycidyl isocyanurate which can be separated by crystallization.

Also, according to the process of Ser. No. 288,593 which is a continuation-in-part of United States patent application Ser. No. 10,087, filed February 23, 1960, and now abandoned, cyanuric acid is reacted with excess epichlorohydrin in the presence of high-molecular-weight catalysts, for example, ion exchangers in salt form or in the form of free bases. After completion of the reaction the catalyst and the volatile constituents are removed. By means of this process too, resinous products are obtained, which, as I have shown in Ser. No. 292,725, also consists of triglycidyl isocyanurate to a considerable extent.

In United States Patent No. 2,809,942 a process for the preparation of polyglycidyl cyanurates is described, wherein first cyanuric acid is reacted with epichlorohydrin in the presence of a lower-molecular-weight organic base and an organic solvent, and the chlorohydrin esters obtained are subsequently subjected to a dehydrohalogenation step in the presence of an alkali. According to this process chlorine-containing, resinous, not crystallizing, products are obtained; these are designated as cyanuric acid esters. However, the patentee leaves it unresolved as to whether cyanurates or isocyanurates are produced or mixtures of both.

Lastly, in the Swiss Patent No. 345,347 a process is described concerning the preparation of polyglycidyl esters of cyanuric acid in which process cyanuric acid is reacted with excess epichlorohydrin in the presence of a dry, hydrogen-chloride-binding compound. The products, prepared according to this process are of liquid to solid form and have a yellow to brown coloring. They are not crystalline.

The two last named processes yield products which are less suitable for the preparation of pure, crystalline compounds. The two first described processes yield products having a higher content of epoxide oxygen and triglycidyl isocyanurate. However, they require a considerable excess of epichlorohydrin.

The present invention solves the problem by reacting cyanuric acid with the smallest possible excess of epichlorohydrin and obtains in this way the highest yields possible of crystalline triglycidyl isocyanurate. This is possible, when the method described hereinafter is being followed.

An object of the present invention is the development of a process for the preparation of crystalline triglycidyl isocyanurate which comprises the steps of:

(a) Reacting about 1 mol of cyanuric acid with from about 3 to about 15 mols of epichlorohydrin in the presence of at least 50% of the mother liquor from a previous crystallization step at elevated temperatures, to produce a chlorohydrin ester, (b) Dehydrohalogenating the chlorohydrin ester obtained by the action of an alkaline reacting compound at a pH of below about 13 for the dehydrohalogenating mixture, (c) Admixing the dehydrohalogenated product with a crystallization solvent selected from the group consisting of methanol, ethylene glycol monomethyl ether and ethylene glycol monoethyl ether.

(d) separating and recovering said crystalline triglycidyl isocyanurate from the crystallization mother liquor, and (e) Returning at least 50% of the crystallization mother liquor to said reaction producing said chlorohydrin ester.

Another object of the present invention is the development of a continuous, recycling process for the production of crystalline triglycidyl isocyanurate which comprises the steps of:

(a) Mixing at least 50% of the solvent-containing mother liquor from a previous crystallization step with cyanuric acid and epichlorohydrin, said cyanuric acid and said epichlorohydrin being in a molar ration of from about 1 to 3 to about 1 to 15, (b) Heating said mixture to a temperature of between 70° C. and 200° C. while gradually adding the remainder of the solvent-containing mother liquor from a previous crystallization thereto, to produce a chlorohydrin ester, while distilling therefrom said solvent, (c) Dehydrohalogenating said chlorohydrin ester obtained by the action of an alkaline-reacting compound while maintaining the pH at a value between about 9 and 13, at a temperature below 100° C., (d) Admixing the dehydrohalogenated product with a crystallization solvent selected from the group consisting of methanol, ethylene glycol monomethyl ether and ethylene glycol monoethyl ether.

(e) Separating and recovering said crystalline triglycidyl isocyanurate from the crystallization mother liquor.

(f) returning all of said crystallization mother liquor to said mixing step (a) and said heating to produce a chlorohydrin step (b), and (g) repeating said process.

These and other objects of the invention will become more apparent as the description thereof proceeds.

According to the invention, first of all, cyanuric acid and epichlorohydrin, in a molecular ratio of 1:3 to about 1:15, are reacted at an elevated temperature, after the addition of at least about 50% of the uncrystallized constituents (crystallization mother liquor) of a preceding preparation. Thereafter, hydrogen chloride is separated from the chlorohydrin ester obtained with the aid of an alkaline-reacting compound at a temperature as low as possible, while not exceeding a pH value of in reaction mixture of about 13. Next, the reaction product from which, if necessary, the principal amount of the excess epichlorohydrin and of solvents probably present was removed, was brought to crystallization by being mixed with methanol, ethylene glycol monomethyl ether or ethylene glycol monoethyl ether. The crystalline components are separated and uncrystallized components are returned to the reaction. At least 50% of the uncrystallized components are returned to the first phase, the remainder, if any, may be added in the second phase (dehydrohalogenation step).

The first step of the process of the invention, namely the reaction of cyanuric acid and epichlorohydrin, is effected in such manner that cyanuric acid and epichlorohydrin are reacted in a molecular ratio of 1:3 to about 1:15 at an elevated temperature between 70 to 200° C. At repeated performance of the process, at least about 50%, but preferably the entire amount of the mother liquor of the previous mixture is added to the cyanuric acid and epichlorohydrin. This mother liquor contains the crystallization solvent and the uncrystallized constituents of the reaction mixture. Rather, as a surprise, it was found that even with frequent repetitions of this operation, no accumulation of uncrystallized products occurs. Instead, the uncrystallized constituents of the mother liquor are converted into crystallizable triglycidyl isocyanurate to a great extent.

This surprising conversion of the uncrystallizing constituents only occurs when the dehydrohalogenation is effected in the manner described. If the work is carried out according to the examples of the United States Patent 2,809,942, i.e. if the hydrogen chloride is separated by means of sodium hydroxide at temperatures above 50° C., by-products are formed to a considerable extent which do not permit conversion into triglycidyl isocyanurate. It is possible to bring this type of mixture to crystallization by the use of methanol as a crystallization solvent; however, the yield of crystallized products was essentially smaller than obtained with the working method of the present invention. When the mother liquor from this crystallization step was added to the next esterification reaction mixture, no crystallization occurred at all.

Also surprising was the fact that an essential acceleration of the reaction between the cyanuric acid and epichlorohydrin is effected due to the addition of the uncrystallized constituents of the preceding preparation. Comparative tests have shown that methanol or ethylene glycol monomethyl ether or ethylene glycol monoethyl ether alone do not show the same effect (see Example IV). Without addition of the uncrystallized constituents of the preceding preparation, the reaction period for the reaction of the cyanuric acid with the epichlorohydrin amounts to about 10 to 12 hours at a temperature of about 110° C., and more than 20 hours at a temperature of 80° C. On adding the uncrystallized constituents to the esterification reaction mixture, however, the reaction is completed within 3 to 4 hours at a temperature of 80° C. Consequently, the addition of specific catalysts, which is required for this step in the process described in United States Patent 2,809,942, becomes superfluous.

When the reaction between cyanuric acid and epichlorohydrin is accomplished at temperatures up to the boiling point of epichlorohydrin, it is advantageous to use the epichlorohydrin at an amount of at least 4 mols to each mol of cyanuric acid. In the case that the reaction is conducted at elevated temperatures up to about 200° C. under pressure, having the advantage of a very short reaction period, very satisfactory yields are still obtained with an amount of 3 to 4 mols of epichlorohydrin to each mol of cyanuric acid. As a rule it is not necessary to use the epichlorohydrin at an amount of more than 10 mols to each mol of cyanuric acid. A greater excess of more than 15 mols will not cause any harm, but it is not advantageous for economical reasons.

Employing temperatures higher than about 120° C., it may be practical in batch operations to add only one portion, for example about 50 to 75% of the uncrystallized constituents of the preceding preparation, in the first process or esterification step to avoid a too vigorous reaction. The remaining amount may be added without any particular reduction in yield, in the second process step (dehydrohalogenation). In the case that in the first step less than about 50% of the uncrystallized constituents of a preceding preparation are added and the remaining amount is added only in the second step (dehydrohalogenation), a distinct decrease in the yield of crystallized triglycidyl isocyanurate occurs on frequent repetitions of the process.

In continuous processing, the reaction may be controlled satisfactorily even at temperatures above 120° C., and even at considerably higher reaction temperatures of for example 130 to 180° C., and all of the uncrystallized constituents of the preceding preparation may be used in the first process step.

Working without pressure has the advantage that methanol, present in the mother liquor of the preceding mixture, may be separated without difficulty by fractionating distillation. Therefore the process of the invention may be carried out with particular ease.

The excess epichlorohydrin may easily be recovered. A saponification or polymerization of the epichlorohydrin does not occur when the work is performed correctly.

In this first reaction step, first of all the tris-chlorohydrin ester of isocyanuric acid is formed. According to the respective amount of excess epichlorohydrin, the product may already contain a certain amount of glycidyl compounds.

The dehydrohalogenation of the reaction product of the first process step may be accomplished with the aid of various alkaline-reacting compounds. In every case, and depending on the alkaline-reacting compound utilized, the reaction must be conducted at a temperature as low as possible, so that no undesired by-products are developed. The dehydrohalogenation should be conducted at a temperature of below 100° C. For this second step of the process, if necessary, the remaining amount of the uncrystallized constituents of the preceding mixture not added in the first step, is used.

If the dehydrohalogenation is carried out with a strong alkali, for example, sodium hydroxide, it is necessary for the obtention of satisfactory yields to maintain the reaction temperature below 50° C. The best yields were obtained at a reaction temperature between 20 to 30° C. The strong alkali may be used either in solid form or in the form of solution. Alkali metal hydroxides are considered strong alkalis.

If the dehydrohalogenation is carried out with an alkali metal carbonate, preferably sodium carbonate in solid form or in the form of a solution, it is necessary to use a slightly higher reaction temperature of about 50 to 100° C. In this case, the best results were obtained at a temperature of 60 to 70° C.

Advantageously, the reaction mixture in this second process step shall not exceed a pH value of about 13. It is preferable to maintain a pH value of 9 to 11 (measured with a glass electrode). To guarantee this value the alkaline-reacting compound is added gradually, at the same time the pH value of the mixture is being followed and controlled.

It is further of advantage to add in this process step an organic, water-immiscible solvent. Chlorinated hydrocarbon solvents such as methylene chloride, ethylene chloride, chloroform or ethylene trichloride are advantageous for this purpose.

When using an aqueous sodium hydroxide with a concentration up to about 25 to 30% as the dehydrohalogenation agent, the sodium chloride formed is completely dissolved in the aqueous phase. When working with a sodium hydroxide solution of this concentration and, moreover, adding one of the solvents listed in the preceding, the separation of the sodium chloride formed is very simple, as the aqueous and the organic layer may easily be separated.

It is also possible to carry out the reaction between the chlorohydrin ester formed in the first step, and the alkaline-reacting material in the presence of water-miscible solvents. First of all, the methanol is to be considered. This mode of operation, however, is less preferable as the sodium chloride or other chloride formed has to be filtered from the product.

Any alkaline-reacting material capable of reacting with HCl can be utilized in the dehydrohalogenation step, however it is preferable to utilize an inorganic compound, for example an alkali metal hydroxide or carbonate, an alkali metal silicate, phosphate or aluminate, or an alkaline earth metal hydroxide. For economical and practical reasons sodium hydroxide or sodium carbonate are preferred.

The alkaline-reacting material is preferably used in a slight excess of about 5 to 15% above the calculated amount. If a greater excess is used, undesired saponification reactions have to be anticipated, which render the yield poorer. The amount of alkaline-reacting material added should always be sufficient to give an alkaline pH during the dehydrohalogenation step. In any case attention should be paid that the dehydrohalogenation takes place under most careful conditions to prevent the formation of undesired by-products which might be apt to impede the crystallization of triglycidyl isocyanurate.

According to a special embodiment of the invention, an excess of anhydrous sodium carbonate is used as alkaline-reacting material, preferably at an amount of at least double the stoichiometric amount. In this case sodium bicarbonate is formed besides sodium chloride, and no water comes into the reaction mixture. The organic substances may be separated from the salt mixture without difficulties, for example by washing with methanol.

After the dehydrohalogenation step, the bulk of the volatile constituents present in most cases, in particular the eventually present excess epichlorohydrin, is removed. This is of importance for example as the crystallization later on may be disturbed by larger amounts of epichlorohydrin or by solvents other than methanol and ethylene glycol monomethyl ether or monoethyl ether. The removal of the epichlorohydrin may be made prior to the dehydrohalogenation step. After removal of the volatile constituents a resinous, yellow product remains which, as a rule, contains 10 to 11% of epoxide oxygen. Numerous experiments have shown that only very few solvents, namely methanol, ethylene glycol monomethyl ether and ethylene glycol monoethyl ether, are capable of effecting crystallization of this product with satisfactory yields. By preference, methanol is used. Some few other solvents do effect crystallization also, but they give far poorer yields. The solvent dioxane, preferably employed in the U.S. Patent No. 2,809,942, does not effect any crystallization.

When the resinous-to-liquid product is diluted with the crystallization solvent such as methanol, crystals separate in large amounts already after a short period at room temperature. By means of cooling the yield of crystallized product may be increased to 50% or more. The crystallization is effected with relatively small amounts of solvents. Good results are obtained, for example, with an addition of solvents at a proportion by weight of 1:1. In general, about 0.5 to 5 parts by weight of solvents are added to one part by weight of resin; a greater excess, for example 5 to 10 parts by weight, is not of any advantage.

The crystallized constituents are separated from the mother liquor in customary manner, for example by filtration. They may be purified by recrystallization. As has been ascertained, isocyanuric acid triglycidyl ester occurs in two modifications, one having a melting point of 104° C. (corrected), the other having a melting point of 158° C. (corrected). The two modifications may be separated due to their different solubility (see Example VII). However, such a separation is not required for the technical utilization of the crystalline triglycidyl isocyanurate.

The mother liquor, which contains the uncrystallized constituents is, as already mentioned, recycled again to the first, or to the first and second process steps. On frequent repetitions of the reaction it has been found, in this manner, that the cyanuric acid with a yield of about 90% or more is converted into substantially pure crystallized isocyanuric acid triglycidyl ester.

The chemicals, employed in the following examples were technically pure. The epichlorohydrin was about 98% pure and contained about 0.2% water. The cyanuric acid was about 97% pure and contained, in addition to some water, traces of ammelide. The caustic soda used was about 91% pure and contained carbonate as well as some water.

The following specific embodiments are illustrative of the process of the invention. They are not, however, to be deemed limitative in any respect.

*Example I*

(a) 129 gm. (1 mol) of cyanuric acid and 465 gm. (about 5 mols) of epichlorohydrin were placed in a 2-liter, three-necked flask provided with a thermometer and a stirrer as well as a connection with an 80 cm.-high filling column. Then 260 gm. of the mother liquor of a mixture prepared beforehand in the same manner as in the present example, were added thereto. The mother liquor consisted of about 60% methanol and about 40% of uncrystallized constituents from a previous reaction. The mixture was heated under stirring and over a period of two and one-half hours, a further 520 gm. of the same mother liquor were added while distilling methanol off continuously through the column. Care was taken that the sump temperature did not exceed 75° C. After an additional half hour the cyanuric acid became completely dissolved. The heating was continued for another half hour thereafter.

(b) The reaction product, which contained some residual methanol as well as excess epichlorohydrin, was briskly stirred with 350 gm. of anhydrous sodium carbonate for 3 hours at a temperature of 65° to 75° C. Thereafter, the salt was filtered off and washed with warm methanol. The filtrate and wash liquor were combined and freed from all volatile constituents first by ordinary distillation, then under vacuum, while care was taken not to exceed a sump temperature of 100° C. The residue was admixed with methanol at a weight ratio of 1:1 and then cooled to 10° C. After the mixture was allowed to stand for a short period, the precipitated crystals were filtered off and then washed twice with methanol. 264 gm. of triglycidyl isocyanurate were obtained, having epoxide oxygen content of 15.2%. The product represented a mixture of the low- and the high-melting forms of triglycidyl isocyanurate.

The example, as described in the preceding, was repeated twice, varying, under otherwise identical conditions, the amount of the epichlorohydrin. In one experiment 370 gm. (4 mols) of epichlorohydrin were used, in the other experiment 925 gm. (10 mols). Practically the same yield of crystalline triglycidyl isocyanurate was obtained in both experiments.

*Note.*—The mother liquor used in this and the following examples may, if it relates to the first performance of the reaction cycle, be prepared in the following manner: With stirring, 1850 gm. of epichlorohydrin (20 mols) and 129 gm. of cyanuric acid (1 mol) were heated in a 2-liter round-bottom flask at reflux for 10 hours. Then the excess epichlorohydrin and the volatile higher-boiling constituents present in the mixture were distilled under vacuum. The remaining residue (about 360 gm.) was admixed with the same amount by weight of methanol and homogeneously mixed.

The material thus prepared has a very similar composition as the mother liquor resulting from the present examples.

Example II

Example I was repeated; however, in place of the anhydrous sodium carbonate, 140 gm. of powdered caustic soda were used for the dehydrohalogenation step according to Example I(b). The caustic soda was added over a period of 4 hours in small quantities in such a manner that the pH value of the reaction solution, which was measured with a glass electrode, was controlled between 9 and 11. The temperature was maintained during this time between 20 and 30° C. by means of water cooling. After the addition was completed the reaction solution was stirred for one hour longer and then filtered to remove the solid constituents. The salt was washed with warm methanol. The further working was carried out as described in Example I(b). 245 gm. of crystalline triglycidyl isocyanurate with a 15.1% content of epoxide oxygen were obtained.

Example III

Example I was repeated, however, instead of the anhydrous sodium carbonate, 560 gm. of a 25% sodium hydroxide solution were used for the dehydrohalogenation step according to Example I(b). In addition, 800 gm. of methylene chloride were added to the mixture. The sodium hydroxide solution was added dropwise to the mixture over a period of 4 hours, during which period the pH value of the reaction mixture was held between 9 and 11. The temperature was maintained between 20° and 30° C. The mixture, after the addition was completed, was stirred for one hour longer; then the aqueous layer was separated and discarded. The organic phase was liberated of all volatile constituents first by ordinary distillation, then under vacuum distillation. The further working was carried out as described in Example I. 238 gm. of crystalline triglycidyl isocyanurate with a 15.3% content of epoxide oxygen were obtained.

Example IV

Example I(a) was repeated; however, instead of adding mother liquor of a previous crystallization, 390 gm. of methanol were added. The methanol was slowly distilled so that a sump temperature of 75° C. was maintained. In contrast to Example I(a), the largest portion of the cyanuric acid started to dissolve only after about 20 hours of heating. After 40 hours of heating a portion of about 5% of the cyanuric acid utilized was still not dissolved.

The example as described above was repeated, however, not 465 gm., but 930 gm. (about 10 mols) of epichlorohydrin were added. Again 20 hours were required until the principal amount of the cyanuric acid commenced to dissolve. After heating the mixture for 40 hours at 75° C., about 5% of the cyanuric acid was still undissolved.

These tests show clearly in relation to Example I that the added mother liquor accelerates the reaction between the cyanuric acid and the epichlorohydrin to a considerable degree, and that this acceleration is not to be traced to the effect of the methanol solvent in the added mother liquor.

Example V 129 gm. of cyanuric acid and 925 gm. of epichlorodrin were placed in an agitator-autoclave of V2A-steel with a capacity of 5 liters. Next, 400 gm. of the mother liquor of a previous mixture (methanol content about 60%) prepared according to Example I were added thereto. This constituted about 50% of the entire mother liquor obtained in Example I. The mixture was heated in the autoclave for about 15 minutes at 135° C. Thereafter, the remaining (about 400 gm.) mother liquor was added to the content of the autoclave which had been cooled to 50° C. The dehydrohalogenation step by means of anhydrous sodium carbonate and the further working was accomplished according to Example I. 258 gm. of triglycidyl isocyanurate containing 15.2% of epoxide oxygen were obtained.

The test as described above was several times repeated without the addition of the mother liquor and with various reaction periods. It was noted here that a fairly complete reaction between the cyanuric acid and the epichlorohydrin occurred only after 90 minutes at the elevated temperature and pressure.

Example VI

Example I was repeated; however, in step (b) instead of methanol, the same amount by weight of ethylene glycol monomethyl ether was used. 195 gm. of crystalline triglycidyl isocyanurate containing 15.2% of epoxide oxygen were obtained.

A repetition of the test using ethylene glycol monoethyl ether in place of methyl ether yielded 182 gm. of crystalline triglycidyl isocyanurate.

Further repetitions of the same test using methylene chloride, acetonitrile, benzonitrile, epichlorohydrin, chloroform and glycerinedichlorohydrin instead of methanol, supplied yields between 50 and 80 gm. of crystallized product. An examination of the crystals revealed that in these cases the yield was practically exclusively the higher-melting form of triglycidyl isocyanurate.

Example VII

The following example illustrates the obtention of the two purely isomeric modifications of the crystalline triglycidyl isocyanurate.

20 gm. of the crystalline product prepared according to Example I, containing 15.2% of epoxide oxygen, were dissolved at a high temperature in 80 gm. of methanol. The solution was cooled to 50° C. and, after a rest period at 50° C. was filtered. The filtration residue was recrystallized from methylene chloride and 5 gm. of a product containing 16.1% of epoxide oxygen and having a melting point of 158° C. (corrected) were obtained. The methanolic mother liquor was cooled to room temperature and allowed to stand for a short period. 13 gm. of a compound were crystallized therefrom which had, after a second recrystallization from methanol, a 16.1% content of epoxide oxygen and a melting point of 104° C. (corrected).

Example VIII 129 gm. of cyanuric acid, 325 gm. of epichlorohydrin and 500 gm. of a mother liquor with a content of 65% of methanol were placed in an agitator-autoclave of V2A-steel with a capacity of 5 liters. This mixture was heated under stirring for 5 minutes at 135° C. After cooling the mixture to 50° C., the remaining mother liquor (about 400 gm.) was added. 238 gm. of triglycidyl isocyanurate containing 15.3% of epoxide oxygen were obtained after dehydrohalogenation with anhydrous sodium carbonate and completing the work according to Example I(b).

Example IX

Example I was repeated, however, with the difference that in step (a) the entire amount of mother liquor of the preceding mixture was added at the very beginning. The mixture was heated under stirring for altogether 3 hours. In step (b) it was, after dehydrohalogenation, cooled to 0° C. instead of to 10° C. In this case, the yield amounted to 282 gm. of pure, crystalline triglycidyl isocyanurate.

The preceding examples are illustrative to the practice of the invention. It is to be understood, however, that other expedients known to those skilled in the art may be employed without departing from the spirit of the invention or the scope of the appended claims.

I claim:

1. In the process for the preparation of crystalline triglycidyl isocyanurate by the steps of:

(a) reacting about 1 mol of cyanuric acid with from about 3 to about 15 mols of epichlorohydrin in the presence of a catalyst at elevated temperatures, to produce a chlorohydrin ester, (b) dehydrohalogenating the chlorohydrin ester obtained by the action of an alkaline reacting compound, (c) admixing the dehydrohalogenated product with a crystallization solvent selected from the group consisting of methanol, ethylene glycol monomethyl ether and ethylene glycol monoethyl ether; and (d) separating and recovering said crystalline triglycidyl isocyanurate from the crystallization mother liquor, the improvement which comprises utilizing as said catalyst in step (a) at least 50% of the mother liquor from a previous crystallization step (d) and conducting said dehydrohalogenating step (b) at a pH of below about 13 for the dehydrohalogenating mixture.

2. The process of claim 1, step (a) wherein the reaction between cyanuric acid and epichlorohydrin is conducted in the presence of all of the mother liquor from a previous crystallization step.

3. The process of claim 1 wherein the reaction of step (a) between cyanuric acid and epichlorohydrin is conducted in the presence of at least 50% of the mother liquor from a previous crystallization step at a temperature between about 120° C. and 200° C. and the remainder of the mother liquor from a previous crystallization step is added to the reaction mixture of step (a) before dehydrohalogenating.

4. The process of claim 1, step (b), wherein said alkaline-reacting compound is present in an amount of from about 5% to 15% in excess of the stoichiometric amount.

5. The process of claim 1, step (b), wherein said alkaline-reacting material is an alkali metal hydroxide and the dehydrohalogenation is conducted at temperatures between about room temperature and 50° C.

6. The process of claim 1, step (b), wherein said alkaline-reacting material is an alkali metal carbonate and the dehydrohalogenation is conducted at temperatures between about 50° C. and 100° C.

7. The process of claim 6 wherein anhydrous sodium carbonate is present in an amount of at least double the stoichiometric amount.

8. The process of claim 1, step (c) wherein said crystallization solvent is admixed with said dehydrohalogenated product in a ratio of 0.5:1 to 5:1 by weight.

9. The process of claim 8 wherein said crystallization solvent is methanol.

10. A continuous, recycling process for the production of crystalline triglycidyl isocyanurate which comprises the steps of (a) mixing at least 50% of the solvent-containing mother liquor from a previous crystallization step with cyanuric acid and epichlorohydrin, said cyanuric acid and said epichlorohydrin being in a molar ratio of from about 1 to 3 to about 1 to 15, (b) heating said mixture to a temperature of between 70° C. and 200° C. while gradually adding the remainder of the solvent-containing mother liquor from a previous crystallization thereto, to produce a chlorohydrin ester, while distilling therefrom said solvent, (c) dehydrohalogenating said chlorohydrin ester obtained by the action of an alkaline-reacting compound while maintaining the pH at a value between about 9 and 13, at a temperature below 100° C., (d) admixing the dehydrohalogenated product with a crystallization solvent selected from the group consisting of methanol, ethylene glycol monomethyl ether and ethylene glycol monoethyl ether, (e) separating and recovering said crystalline triglycidyl isocyanurate from the crystallization mother liquor, (f) returning all of said crystallization mother liquor to said mixing step (a) and said heating to produce a chlorohydrin step (b), and (g) repeating said process.

References Cited by the Examiner

UNITED STATES PATENTS

| 2,741,607 | 4/1956 | Bradley et al. | 260—248 |
| 2,809,942 | 10/1957 | Cooke | 260—248 XR |
| 2,894,950 | 7/1959 | Lloyd et al. | 260—248 |
| 3,033,803 | 5/1962 | Price et al. | 260—348.6 |

FOREIGN PATENTS

| 595,729 | 4/1960 | Canada. |
| 1,045,099 | 11/1958 | Germany. |

WALTER A. MODANCE, *Primary Examiner.*

JOHN M. FORD, *Assistant Examiner.*